US012576646B2

(12) United States Patent
von Orelli et al.

(10) Patent No.: US 12,576,646 B2
(45) Date of Patent: Mar. 17, 2026

(54) PLATE FOR A PRINT HEAD AND PRINT HEAD ASSEMBLY INCLUDING SAID PLATE

(71) Applicants: ATLANTIC ZEISER GMBH, Emmingen-Liptingen (DE); HAPA AG, Volketswil (CH)

(72) Inventors: Matthias von Orelli, Volketswil (CH); Steffen Muffler, Emmingen-Liptingen (DE)

(73) Assignees: Atlantic Zeiser GmbH, Emmingen-Liptingen (DE); Hapa AG, Volketswil (CH)

( * ) Notice: Subject to any disclaimer, the term of this patent is extended or adjusted under 35 U.S.C. 154(b) by 187 days.

(21) Appl. No.: 18/122,121

(22) Filed: Mar. 16, 2023

(65) Prior Publication Data

US 2024/0308220 A1 Sep. 19, 2024

(51) Int. Cl.
*B41J 2/175* (2006.01)
*B41J 2/145* (2006.01)

(52) U.S. Cl.
CPC ............... *B41J 2/175* (2013.01); *B41J 2/145* (2013.01)

(58) Field of Classification Search
CPC ........................................................ B41J 2/175
See application file for complete search history.

(56) References Cited

U.S. PATENT DOCUMENTS

2009/0121476 A1* 5/2009 Malito .................... F16L 39/00 285/124.4
2009/0122125 A1* 5/2009 Owaki ................. B41J 2/17563 347/93
2009/0273658 A1* 11/2009 Freitag ..................... B41J 2/175 347/88
2011/0157274 A1* 6/2011 Tamada ............... B41J 2/17509 347/20
2012/0050416 A1* 3/2012 Ishizawa .................. B41J 2/175 347/85
2013/0300809 A1* 11/2013 Sekino ................... B41J 2/1752 347/86
2021/0178769 A1* 6/2021 Haga .................... B41J 2/17503
2023/0034176 A1* 2/2023 Ono .................. B01L 3/502715
2023/0202190 A1* 6/2023 Haga .................... B41J 2/17596 347/84

* cited by examiner

Primary Examiner — Shelby L Fidler
(74) *Attorney, Agent, or Firm* — Carmel Patent Agency; Robert Ballarini

(57) ABSTRACT

A plate for a print head assembly includes a plurality of nozzles passing therethrough, and includes first and second sides, the first side having a raised perimeter defining a seat. Each of the nozzles also includes a flange extending from the seat. A print head assembly includes: a print head having a plurality of hose connectors; at least one detachable plate having a plurality of nozzles passing therethrough; and a plurality of hoses connecting said at least one plate to the print head. The nozzles each include first and second ends, the first end extending from the first side of the plate and have a chamfered periphery, which is configured to be received in an opening of an ink tank of a print head assembly. The second end includes a frustoconical tapered end, which is configured to be connected to a hose that connects to the print head.

9 Claims, 9 Drawing Sheets

PLATE FOR A PRINT HEAD AND PRINT HEAD ASSEMBLY INCLUDING SAID PLATE

FIELD OF THE INVENTION

The present invention generally relates to an ink delivery system, in particular, to a plate assembly for use with print heads of ink delivery systems.

BACKGROUND

Print head assemblies may include: a fluid reservoir; dispensing device; fluid interconnections (tubes) between the reservoirs and dispensing devices; filter elements; connections to a pneumatic controller and inert gas source; connections to the electronics controller; heating elements and connections to temperature controllers; and mechanical mounting.

The use of drop-on-demand (DOD) inkjet printing using ultra-violet (UV) curable ink has become a proven replacement for existing legacy technologies such as thermal or embossing/topping. Issuers and personalization bureaus benefit from more durable and long-lasting personalized cards at reduced costs. DOD printing has been approved by all major payment schemes including MasterCard®, VISA® and American Express®. After printing, the ink needs to be cured by exposure to UV light. DOD printing A print head of a DOD inkjet printer is normally connected to an ink supply manifold by a plurality of semi-rigid tubes or hoses. The manifold in turn, is fed by tubes from a main source of the inks. As shown in FIG. 1, the print head P is attached by tubes 400 to the manifold 200 which is in turn fed by supply lines 300 to a main ink supply reservoir. The tubes, which connect the manifold 200 to the print head P, are semi rigid and connect via a nozzle 500 (as shown in FIG. 2).

In DOD printing, partially cured ink and other debris can accumulate on the print head outlet surface and adversely affect the ink's flow and therefore the print quality. Regular cleaning of the print head outlet surface is therefore often conducted. Printers also periodically require exchanging of the print heads either for maintenance or for adapting to various printing requirements. The changing of the print heads can be quite time-consuming and cumbersome in that the tubes are semi rigid and difficult to remove from the manifold due to the sealing connection.

Often, the tubes need to be manually cut from the nozzles in order to be able to be removed. In doing so, the nozzles can be damaged and need to be replaced, thereby resulting in extensive downtime and expense in replacing the nozzles or even the manifold to which they are attached.

Attempting to pull the tubes from the nozzles also creates the potential for damaging the manifold and print head. Further, due to the use of UV cured inks, the tubes are often black in color, so that no light can penetrate the tubes and cure the ink in the tubes. This creates a need to ensure that the tubes are correctly connected from the manifold nozzle to the printhead nozzle. There are often up to eight (8) tubes connected to a single print head, which creates the possibility for connecting the tubes to the nozzles incorrectly. Connecting the individual tubes to the print head is also time consuming.

Multiple print heads are often used in a single printer assembly, and therefore number of nozzles to be connected to the print head increases therewith. If the tubes are connected incorrectly, printing will be unacceptable, and the print head will need to be cleaned, or possibly even discarded.

Therefore, there is a need for a fail-safe system for quickly and easily changing print heads, which obviates the possibility of incorrectly connecting the ink tubes to the print head and which also obviates the possibility of damaging the nozzles of the ink supply manifold.

SUMMARY

An object of the present invention is to provide a reliable and easy to use system, in which a print head is connected to a plate, to which the ink feed tubes are already connected, which in turn is connected to an outlet of the ink supply.

This object is achieved by a plate for a print head assembly comprising a plurality of nozzles passing therethrough, and having first and second sides, the first side comprising a raised perimeter defining a seat, wherein each of the nozzles comprising a flange extending from the seat.

This object is also achieved by a print head assembly comprising:

a print head having a plurality of hose connectors;

at least one plate having a plurality of nozzles passing therethrough; and a plurality of hoses connecting said nozzles of the at least one plate to said hose connectors of the print head, wherein the nozzles each comprise first and second ends, the first end extending from a first side of the plate and being configured to be received in an opening of an ink tank of a printer assembly, and the second end extends from the second side of the plate and is configured to be connected to the hose that connects to the print head.

BRIEF DESCRIPTION OF THE DRAWINGS

The following detailed description of the preferred embodiment of the present invention will be better understood when read in conjunction with the appended drawings. For the purpose of illustrating the invention, there are shown in the drawings embodiments, which are presently preferred. It is understood, however, that the invention is not limited to the precise arrangements and instrumentalities shown. In the drawings.

DETAILED DESCRIPTION OF THE PREFERRED EMBODIMENTS

Figure 1:
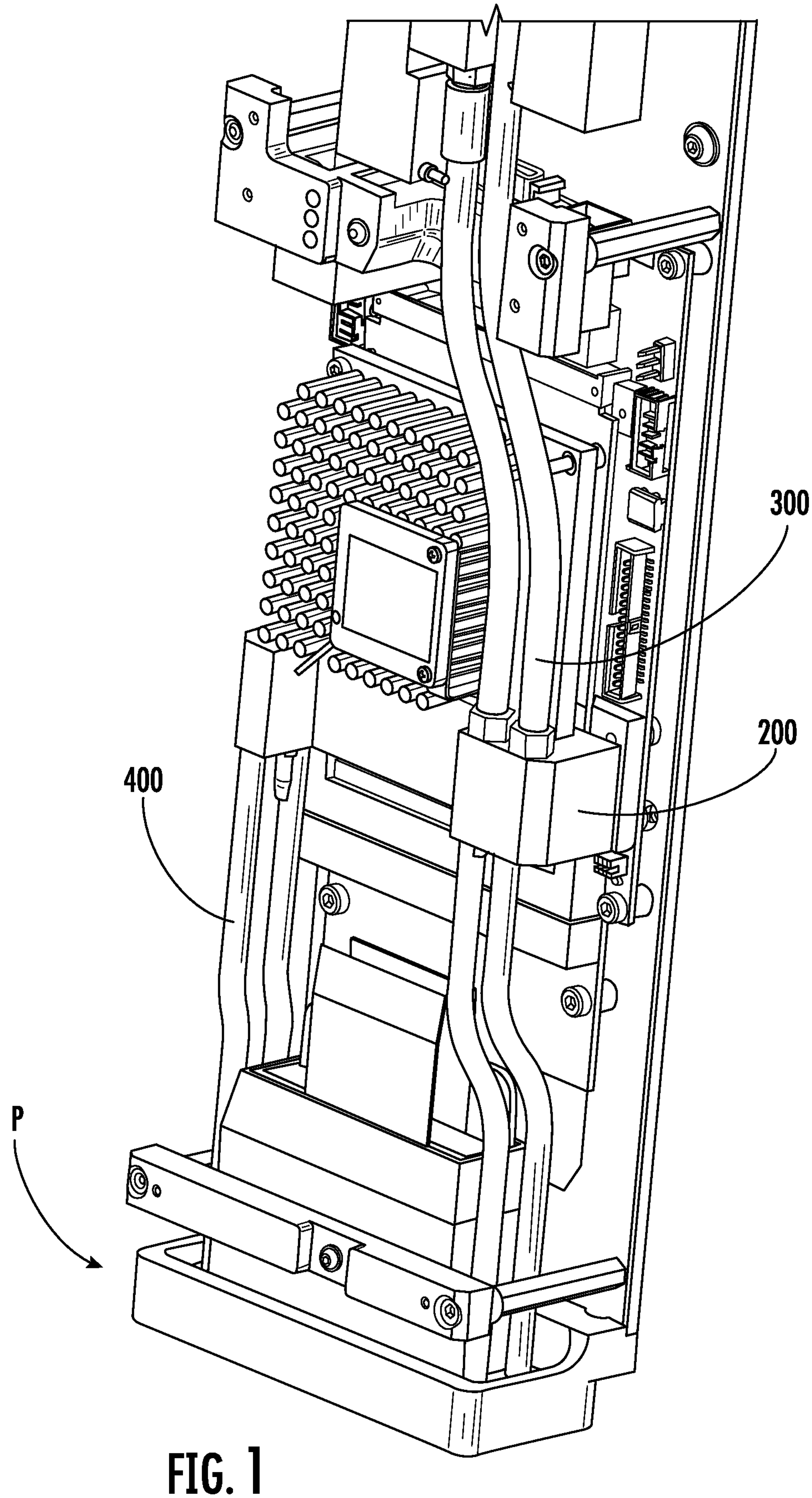
FIG. 1 is a representation of a known print head assembly connected to an ink supply manifold.
Figure 2:
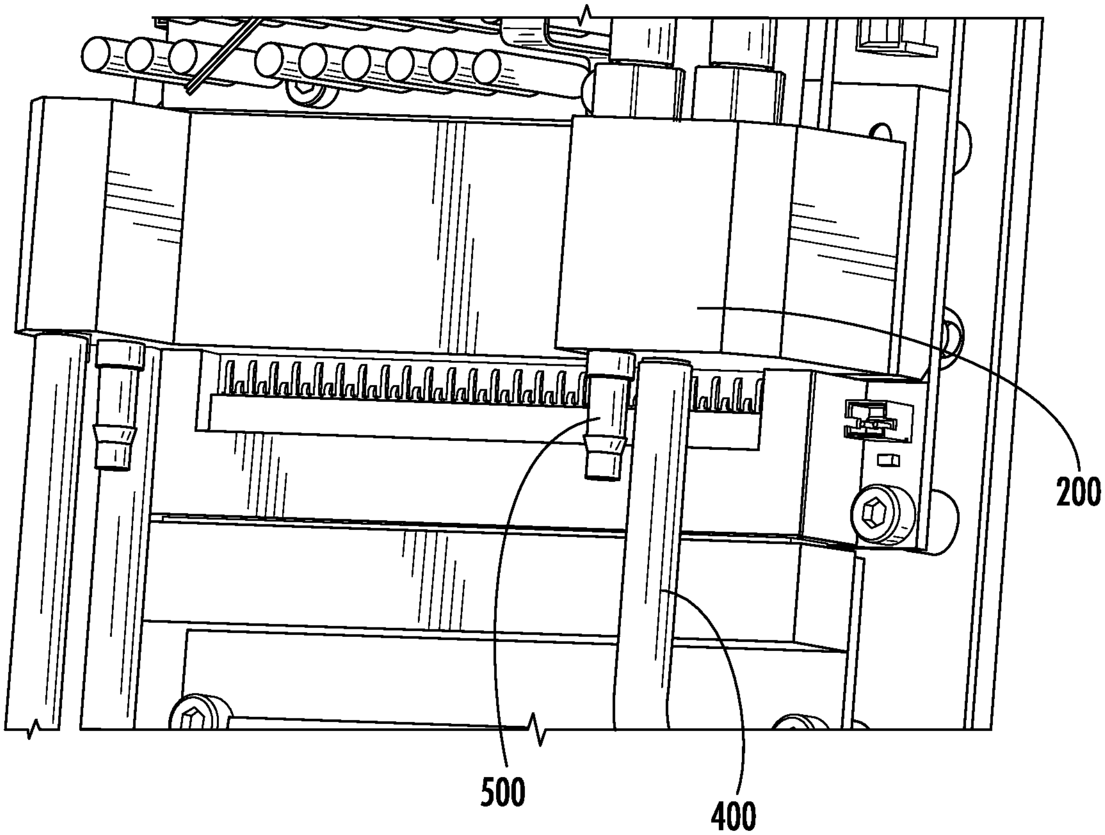
FIG. 2 is a detail of the assembly of FIG. 1, showing the manifold nozzles to which, the tubes connect.

Certain terminology is used in the following description for convenience only and is not limiting. The words "right,"

"left," "top," and "bottom" designate directions in the drawings to which reference is made. The words "a" and "one," as used in the claims and in the corresponding portions of the specification, are defined as including one or more of the referenced items unless specifically stated otherwise. This terminology includes the words above specifically mentioned, derivatives thereof, and words of similar import. The phrase "at least one" followed by a list of two or more items, such as "A, B, or C," means any individual one of A, B or C as well as any combination thereof.

Figure 3:
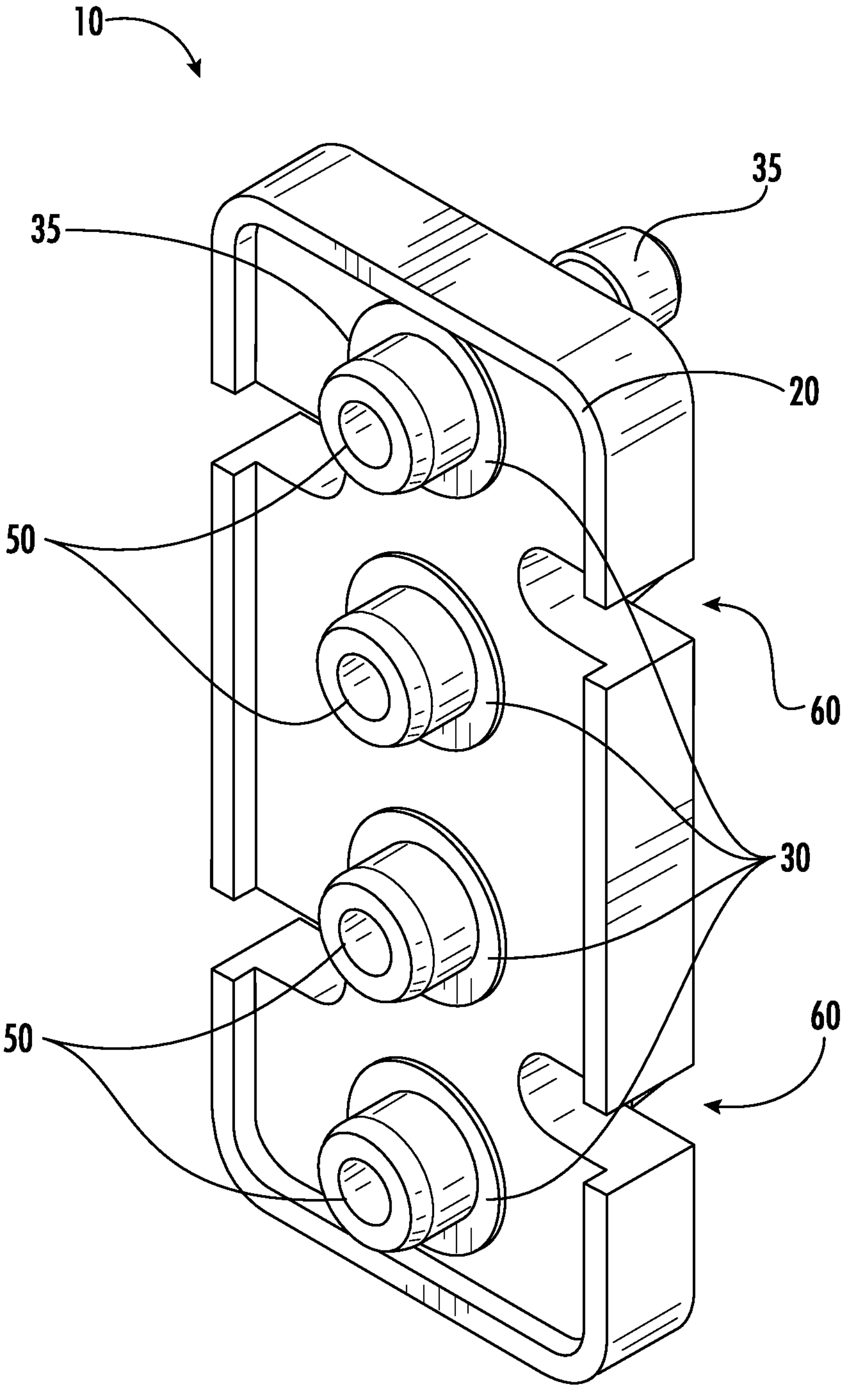
FIG. 3 is an isometric view of a plate described herein.
Figure 4:
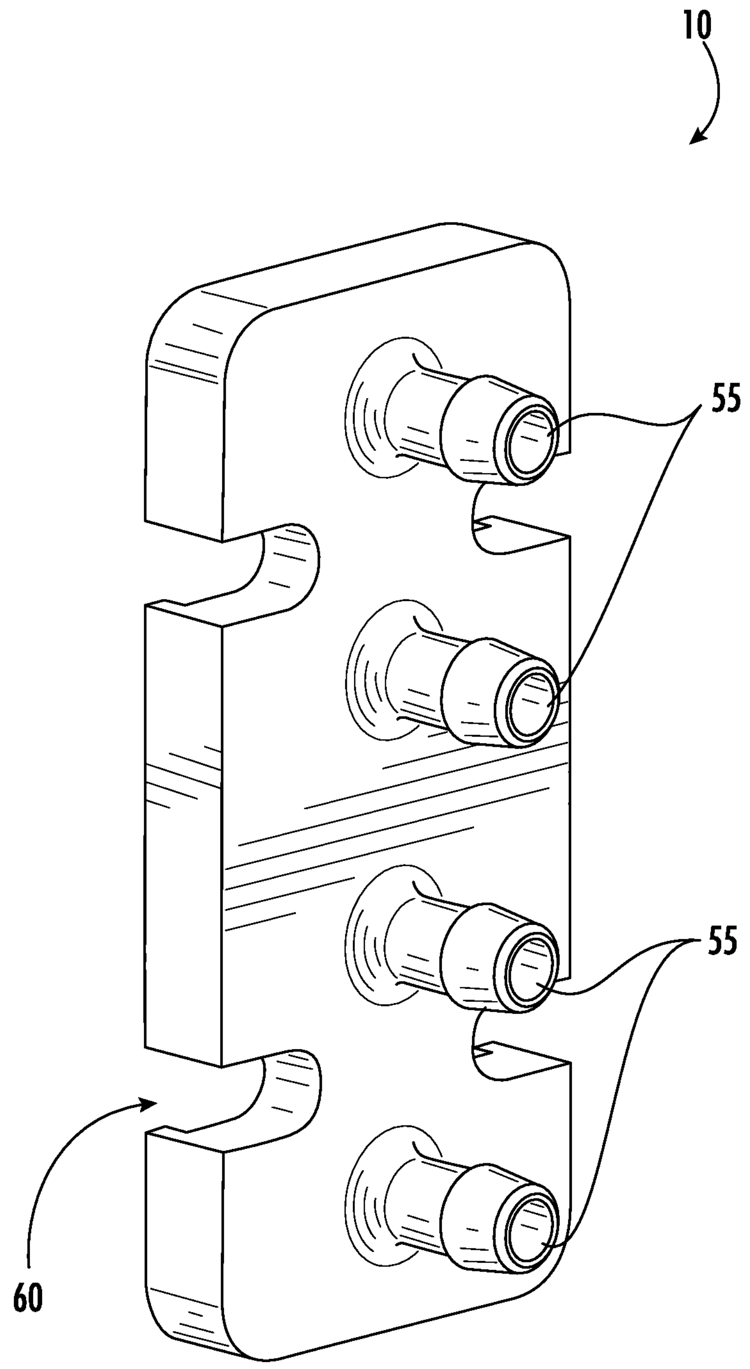
FIG. 4 is an isometric view of the opposite side of the plate shown in FIG. 3.
Figure 5:
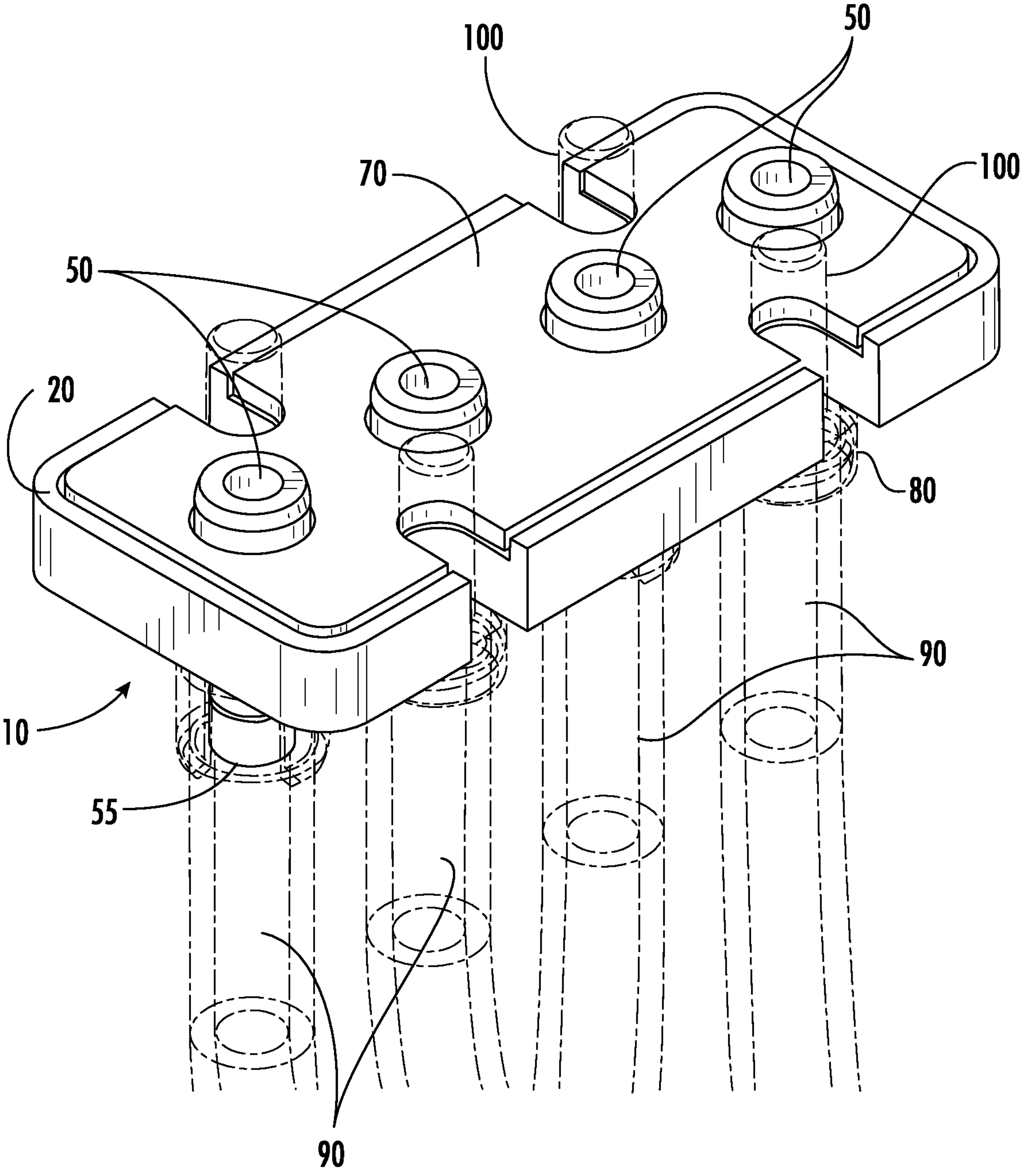
FIG. 5 is an isometric view of the plate connected to ink supply tubes.

In FIG. 3, plate 10 includes a first side and an opposite second side (FIG. 4). The plate has a raised edge 20, which defines a recess 35 of the first side. The recess 35 is dimensioned to receive an elastomeric sealing member 70 (FIG. 5).

The plate 10 includes a series of hose nozzles 50 passing therethrough. The nozzles each comprise first and second ends, the first end extending from the seat of the first side of the plate and has a chamfered periphery, which is configured to be received in an opening of an ink tank of a print head assembly. The first and second ends of the nozzles can include color coding or other indicia to indicate the hoses that should be connected to the plate.

The hose nozzles 50 extend beyond the raised edge 20 of the first side. It is noted that the height of the raised edge 20, and resulting seat 35, defines a specific surface pressure, which corresponds to the requirements of the sealing element 70. The first side also includes flanges 30 at the base of each nozzle 50. The flanges serve to increase surface pressure around holes of the ink tank of the printer. This increase in surface pressure obviates the need for O-rings, which reduces the number of parts required and also reduces the possibility of malfunction.

The plate 10 also includes openings 60 for fasteners 110 (FIG. 5) to attach the plate 10 to the printer. The openings can be arranged in a "polarized" manner i.e., being able to be inserted in one way. Similarly, the arrangement of the nozzles 50 in the plate 10 can be such that the plate can be installed into the print head assembly or in the ink tank in only one way. Since the plate can be connected into the print head assembly or in the ink tank in only one orientation, the possibility of installing the plate incorrectly is obviated.

FIG. 4 shows the second side of the plate 10, which includes hose connection portions 55 of the hose nozzles 50 which connect to the hoses 90. The connection portions 55 have a frustoconical taper, which ensures a secure attachment of the hose 90 to the nozzle 50. As shown in FIG. 5, hoses 90 are connected to the connection portions 55 of the nozzles 50, they are further secured by clamping members 80.

As can be viewed in FIG. 5, the recess 35 acts as a seat for elastomeric sealing member 70. The sealing member 70 can comprise or be comprised of an Ethylene Propylene Diene Monomer (EPDM) rubber, for example Semperit® E9614, or other suitable elastomeric sealing material. The height of the raised perimeter 20 is dependent on the type of material used for the sealing element 70.

The plate 10, with hoses 90 attached and sealing element 70 in place, can now be secured to the ink tank of a printer. When the fasteners 100 are tightened to the ink tank 130 (FIG. 8), the sealing member 70 is arranged on top of the flanges and is compressed and the flanges 30 cause the sealing member 70 portion arranged on top of the flanges to extend the sealing member further than the other portions of the sealing member and thus, further into the openings of the ink tank, creating a secure seal between the openings and the first ends of the nozzles.

This sealing arrangement obviates the need for each nozzle to have an individual O-ring for sealing, thereby reducing the number of parts required and also facilitating and expediting installation and maintenance.

Figure 6:
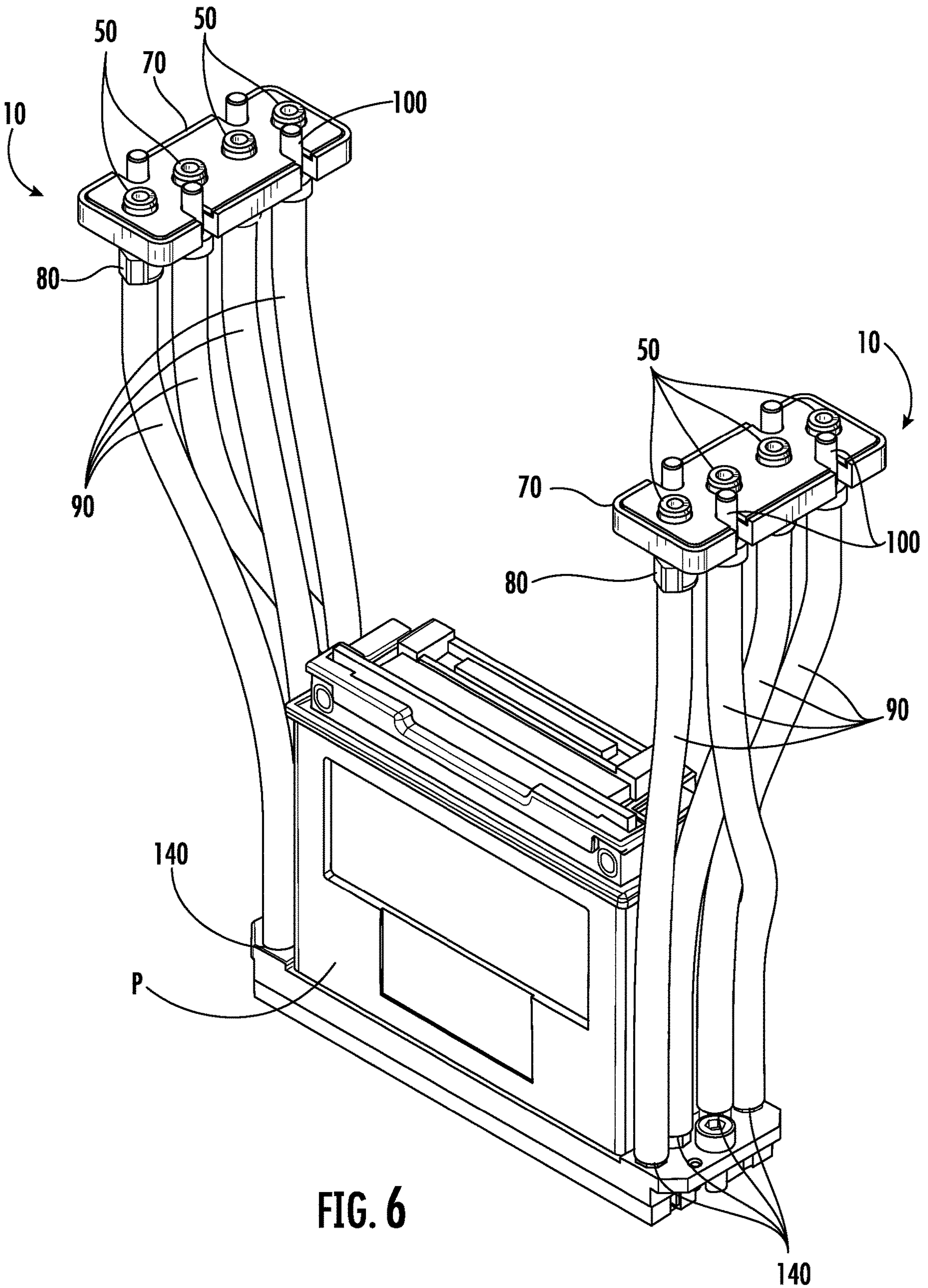
FIG. 6 is an isometric view of the plate attached to a print head.

As shown in FIG. 6 hoses 90 connect the plates 10 to the print head P at connectors 140. In this configuration, two plates, each having 4 nozzles, connect to the print head P at opposite sides thereof. It should be understood that the connectors can be arranged on only one side of the print head. The print head assembly can now be mounted to the ink tank of the printer.

Figure 7:
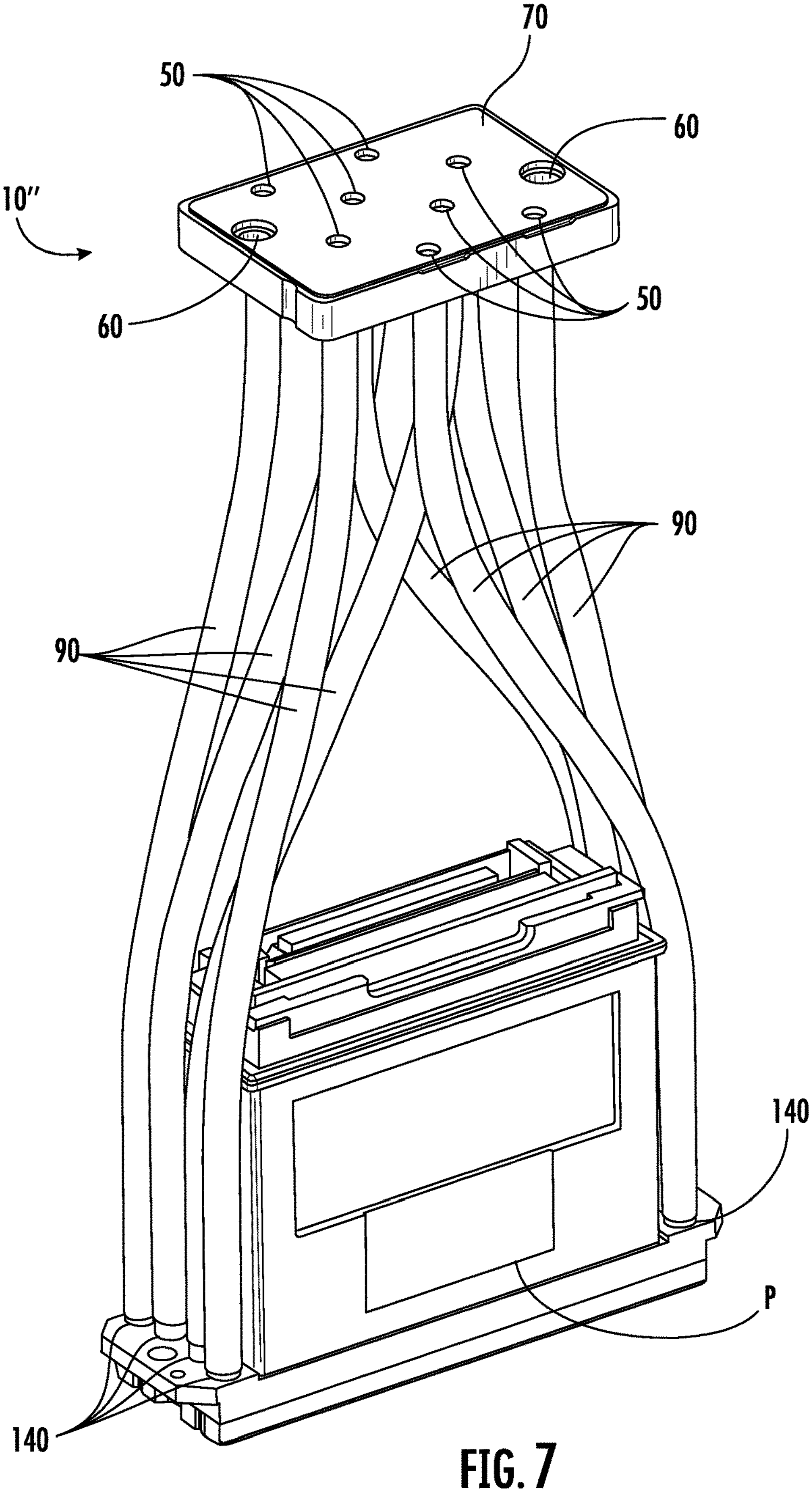
FIG. 7 is an alternate embodiment of the arrangement of FIG. 6.

FIG. 7 shows an alternate embodiment of the plate, which depicts a single plate 10" having eight (8) nozzles 50. Such an arrangement can be useful for smaller printers with limited space.

Figure 8:
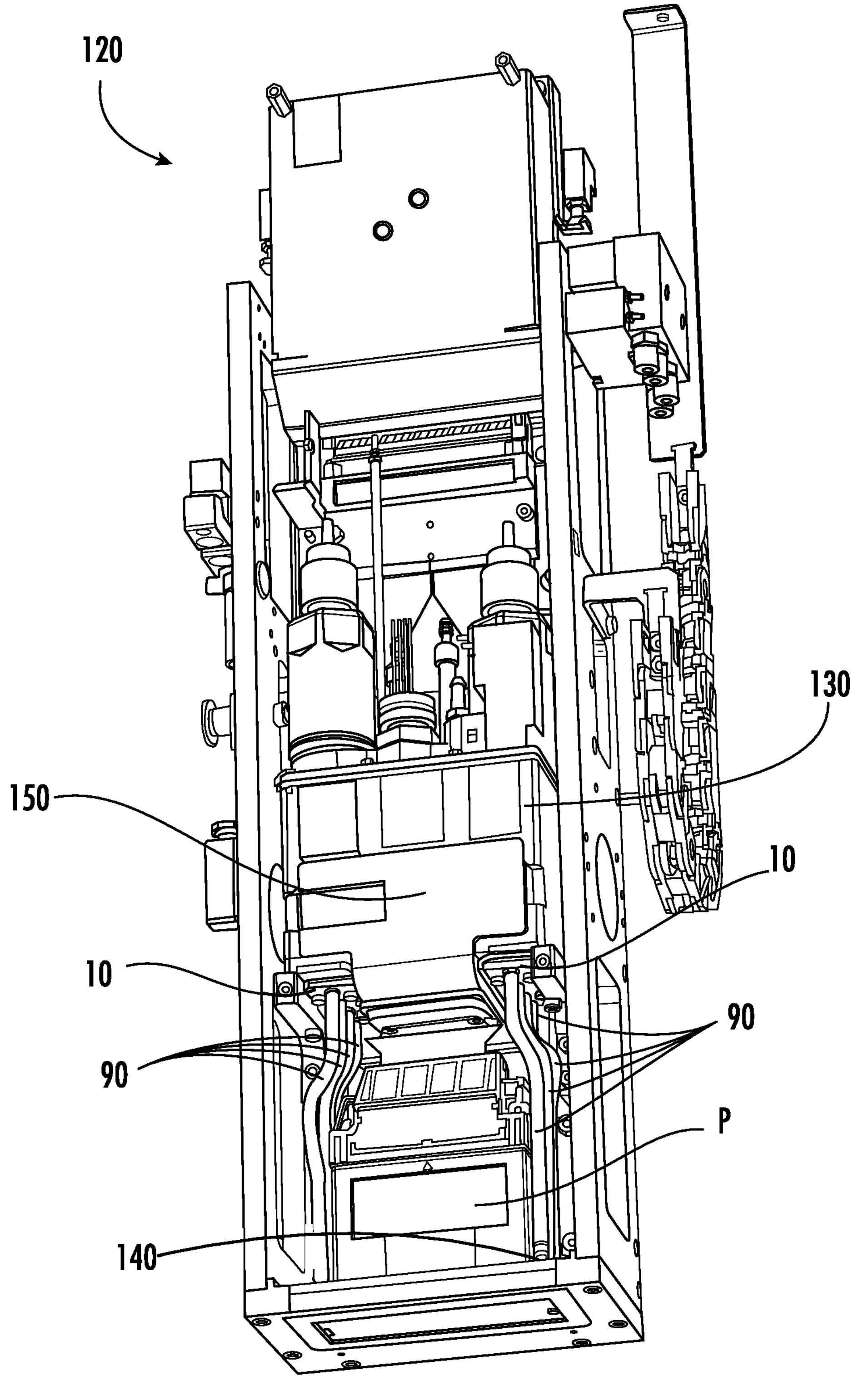
FIG. 8 is a perspective view of a printer assembly with the print head assembly attached to an ink tank.

The print head assembly of FIG. 6 is shown in FIG. 8 installed in a printer assembly 120. The plates 10 are attached to a lower portion of ink tank 130 adjacent a heating mat 150.

Figure 9:
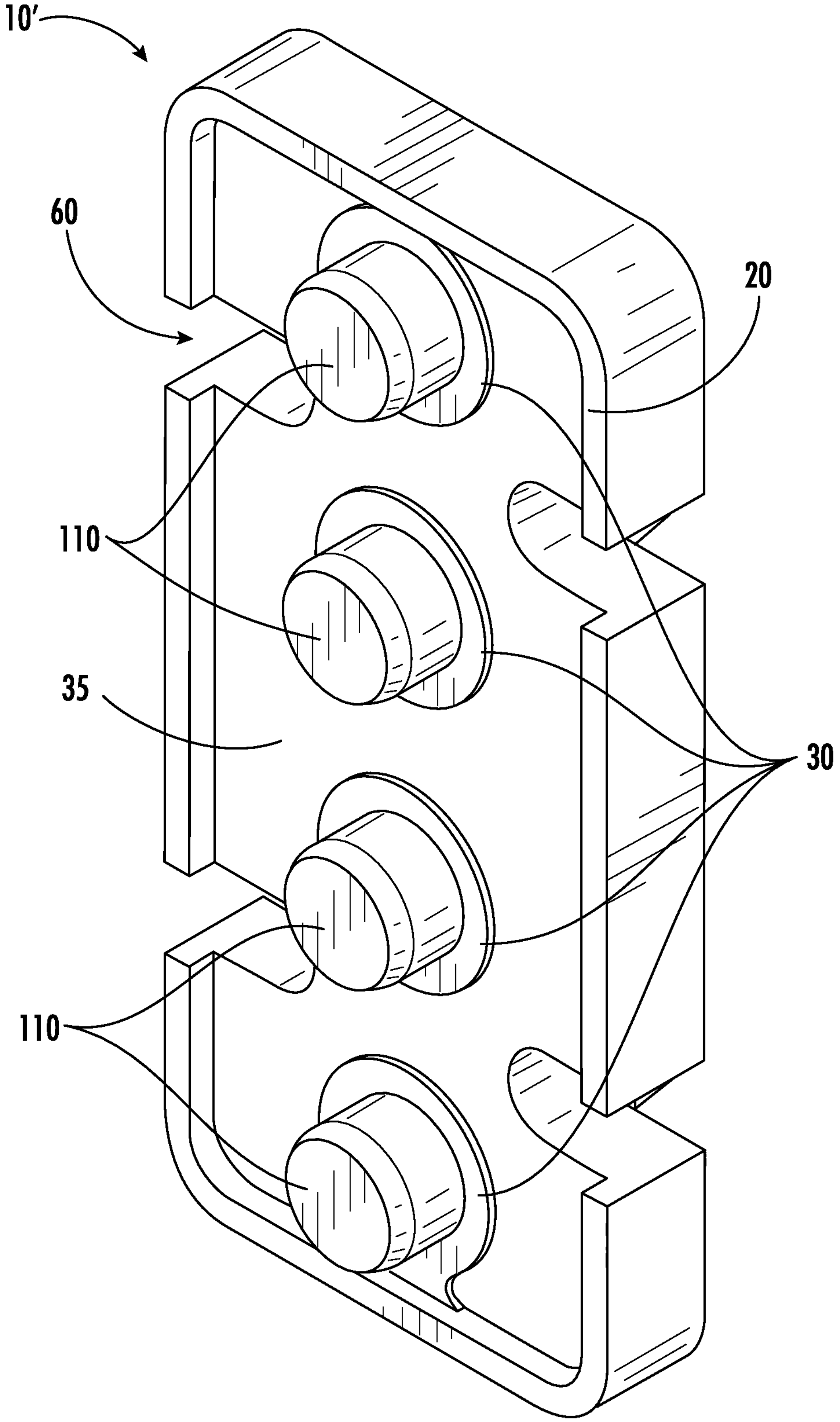
FIG. 9 is an isometric view of an alternate embodiment of the plate.

FIG. 9 shows plate 10', which is an alternate embodiment of plate 10. Since print heads can be exchanged for various printing purposes, i.e., to provide different colors different types of ink for different substrates, etc., ink tank outlets are not always being used. The plate 10' of FIG. 9 has the same dimensions as plate 10, however, instead of having nozzles, the plate includes solid stoppers 110, which seal off the openings of the ink tank. As with plate 10, the stopper plate 10' has a seat 35, which accommodates a sealing member 70, and flanges 30 for the stoppers 110, which create a secure seal when the fasteners 100 are tightened to the ink tank 130. As in the embodiment of plate 10, when the stopper plate 10' is secured to the ink tank, the sealing member 70 is compressed and the flanges 30 cause the sealing member 70 portion arranged on top of the flanges to extend the sealing member further than the other portions of the sealing member and thereby, further into the openings of the ink tank, creating a secure seal between the opening and the stoppers.

It is understood, therefore, that this invention is not limited to the particular embodiments disclosed, but is intended to cover all modifications which are within the spirit and scope of the invention as defined by the appended claims; the above description; and/or shown in the attached drawings.

What is claimed is:

1. A print head assembly comprising:

a print head having a plurality of hose connectors;

at least one plate having a plurality of nozzles passing therethrough; and a plurality of hoses connecting said nozzles of the at least one plate to said hose connectors of the print head, wherein the nozzles each comprise first and second ends, the first end extending from a first side of the plate and being configured to be received in an opening of an ink tank of a printer assembly, and the second end extending from a second side of the plate and being configured to be connected to a hose that connects to the print head, and wherein the second end comprises a frustoconical tapered end, the first side comprises a raised perimeter defining a seat, and wherein each of the nozzles comprises a flange extending from the seat, the print head assembly further comprising a sealing member that is received in the seat, wherein the sealing member is arranged on top of the flanges, and wherein the flanges cause the sealing member to extend the sealing member, in the area of the flanges, beyond other portions of the sealing member, and thereby, further into the openings of the ink tank creating a secure seal between the opening and the first end of the nozzle.

2. The print head assembly according to claim 1, wherein at least one of: the first or second ends of the nozzles comprises at least one of: color-coding or indicia to indicate which hoses should be connected to the plate.

3. The print head assembly according to claim 1, wherein the plate further comprises openings configured to receive fasteners that secure the plate to an ink tank of the print head assembly.

4. The print head assembly according to claim 3, wherein the openings are configured such that the plate can be connected to the ink tank in only one orientation.

5. The print head assembly according to claim 1, wherein the secure seal is created without O-rings.

6. A printer assembly comprising:

a print head assembly comprising:

a print head having a plurality of hose connectors;

at least one plate having a plurality of nozzles passing therethrough; and a plurality of hoses connecting said nozzles of the at least one plate to said hose connectors of the print head, wherein the nozzles each comprise first and second ends, the first end extending from a first side of the plate and being configured to be received in an opening of an ink tank of a printer assembly, and the second end extending from a second side of the plate and being configured to be connected to a hose that connects to the print head, and wherein the second end comprises a frusto-conical tapered end, the first side comprises a raised perimeter defining a seat, and wherein each of the nozzles comprises a flange extending from the seat, the print head assembly further comprising a sealing member that is received in the seat, wherein the sealing member is arranged on top of the flanges, and wherein the flanges cause the sealing member to extend the sealing member, in the area of the flanges, beyond other portions of the sealing member, and thereby, further into the openings of the ink tank, creating a secure seal between the opening and the first end of the nozzle; and an ink tank comprising a plurality of openings, wherein the print head assembly is connected to the ink tank in a removable way by means of the at least one plate.

7. A printer assembly according to claim 6, wherein the at least one plate further comprises openings configured to receive fasteners which secure the plate to the ink tank.

8. A print head assembly comprising:

a print head having a plurality of hose connectors;

at least one plate having a plurality of nozzles passing therethrough; and a plurality of hoses connecting said nozzles of the at least one plate to said hose connectors of the print head, wherein the nozzles each comprise first and second ends, the first end extending from a first side of the plate and being configured to be received in an opening of an ink tank of a printer assembly, and the second end extending from a second side of the plate and being configured to be connected to a hose that connects to the print head, and wherein the second end comprises a frusto-conical tapered end, the first side comprises a raised perimeter defining a seat, and wherein each of the nozzles comprises a flange extending from the seat, the print head assembly further comprising a sealing member that is received in the seat, wherein the sealing member comprises or is comprised of an Ethylene Propylene Diene Monomer (EPDM) rubber.

9. The print head assembly according to claim 8, wherein the Ethylene Propylene Diene Monomer (EPDM) rubber is Semperit® E9614.

* * * * *